Oct. 29, 1929.  P. GUSLUSKY  1,733,875
FRUIT JUICE PRESSURE CONTROL
Filed Aug. 20, 1927  2 Sheets-Sheet 2
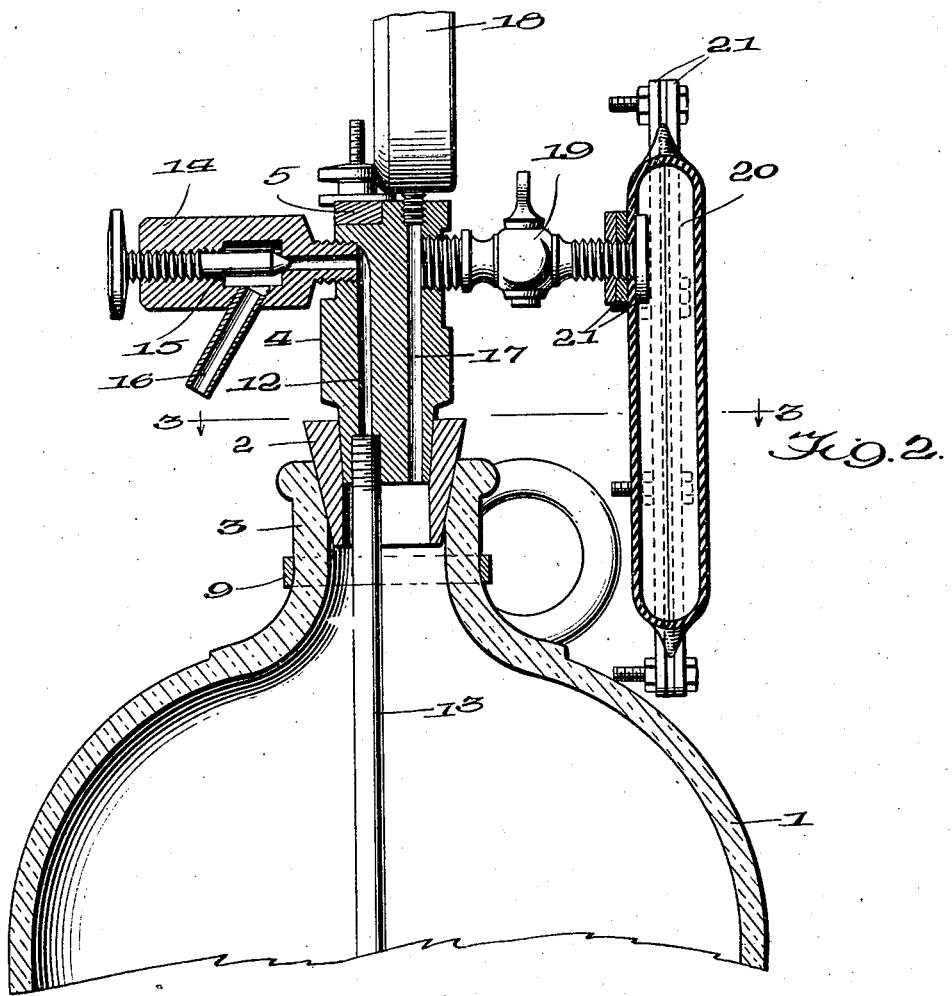
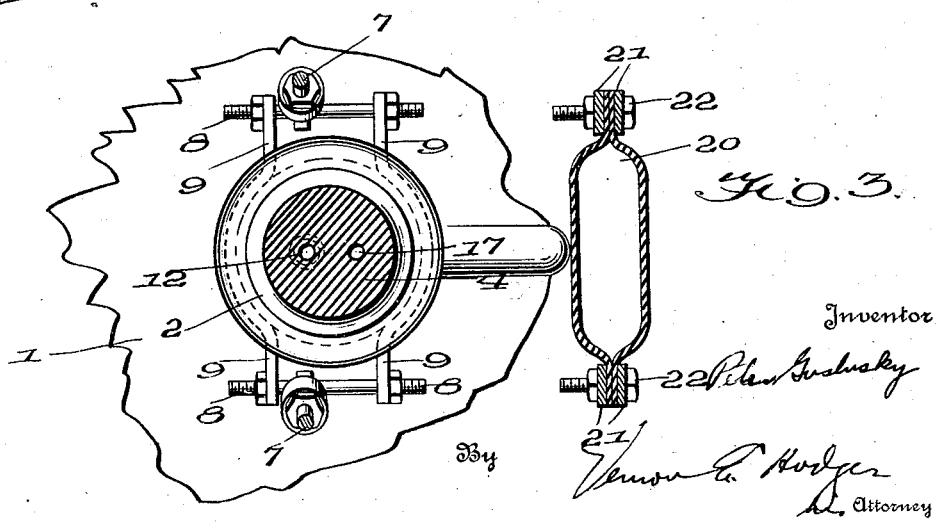

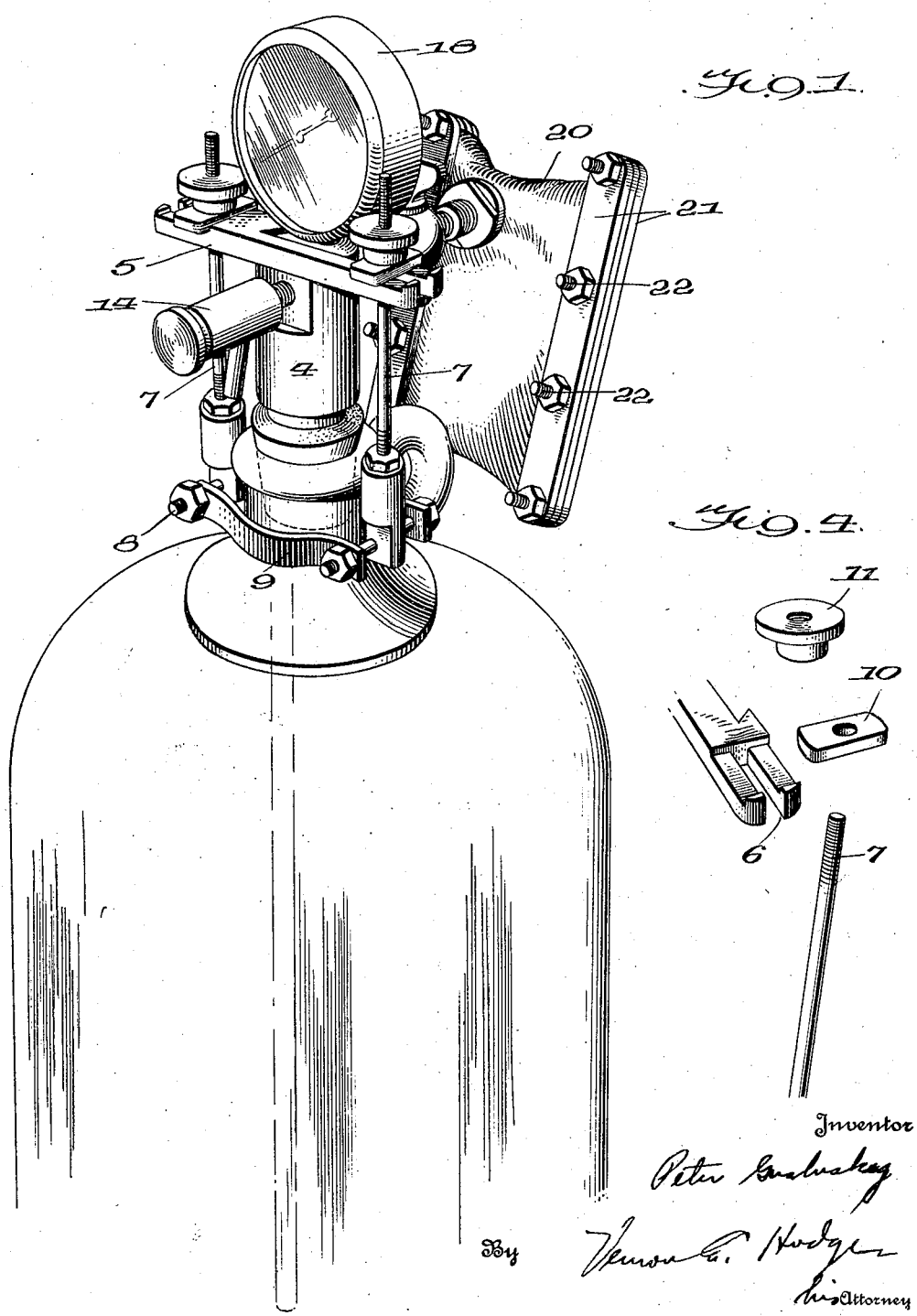

Patented Oct. 29, 1929

1,733,875

UNITED STATES PATENT OFFICE

PETER GUSLUSKY, OF KINGSTON, PENNSYLVANIA

FRUIT-JUICE PRESSURE CONTROL

Application filed August 20, 1927. Serial No. 214,418.

This invention relates to an improvement in fruit juice pressure controls.

The object of the invention is to provide for the holding and preserving of fruit juices, beverages, and other substances capable of generating pressure either through natural chemical action or through the introduction of an outside medium to induce chemical action.

The invention is very simple in structure, and may be easily applied to a suitable receptacle, preferably an enlarged bottle; and when thus applied it receives or controls the pressure created within the bottle by the chemical action of fruit juice, preventing destruction of the bottle and contents.

The invention resides in the structure of the apparatus in which a rubber-collared plug is introduced into the mouth of a container, and has two openings therethrough, one of which establishes communication between a tube which extends to the bottom of the bottle and a valve provided for draining off the fruit juice or beverage. The other opening through the plug communicates with the space in the top of the bottle and the pressure-gauge, as well as with a valve control pressure container which is so constructed as to permit of expansion to compensate for the increase in pressure on the air in the top of the container by reason of the chemical action of the beverage. Suitable clamp mechanism is devised for securing the plug and associated mechanism to the container.

In the accompanying drawings:

Fig. 1 is a perspective view of the invention as applied to the top of a bottle;

Fig. 2 is a sectional view therethrough;

Fig. 3 is a cross sectional view on the line 3—3 of Fig. 2; and

Fig. 4 is a disassembled perspective view of parts of the clamp.

The bottle is designated generally by the numeral 1, and may be used in connection with the invention for containing fruit juices or beverages, although other forms of containers might likewise be employed. A rubber collar 2 is inserted in the neck 3 of the bottle, and receives the lower end of a plug 4. A transverse plate 5 extends across the upper end of the plug 4, being notched out as shown in Fig. 1 for embracing the upper portion of the plug; and the opposite ends of this plate are slotted as at 6 to receive bolts 7 which have the lower ends thereof hinged on similar bolts 8 carried by clamping-straps 9 embracing the opposite sides of the neck 3, as clearly shown in the drawings. The bolts 7 extend through the washers 10 seated upon the slotted ends of the plate 5, and have tightening nuts 11 screwed thereon for securely holding the plug 4 in its seated position in the rubber collar 2.

A duct or opening 12 extends through one side of the plug 4, and its lower end communicates with a tube 13 carried by, and depending from, the plug 4 and extending to a point in proximity to the bottom of the bottle or container. The upper end of the duct 12 communicates with the interior of a valve 14, in which a needle-valve 15 is mounted for controlling the communication between the duct 12 and a drain tube 16. The opposite side of the plug 4 has a similar duct or opening 17 therethrough, extending from the lower end of the plug to a pressure gauge 18, which is fixed in the upper end of the plug so as to establish communication between this pressure-gauge and the space in the upper portion of the bottle above the contents to allow the gauge to register the pressure within the container.

A cut-off valve 19 has one side thereof communicating with the duct 17, as shown in Fig. 2, and on its opposite side it communicates with the interior of a rubber pressure container 20. Small nuts 21 are threaded on to the outer end of the valve 19 on opposite sides of the rubber forming one side of the container 20 in order to hold the container securely in its proper communicating position over the end of the valve.

Clamping-plates 21 extend over the ends of the pressure-container 20, and have bolts 22 passing therethrough to clamp these plates securely and tightly together, providing an air-tight container 20, but allowing them to be released in order to release the pressure within this container.

In applying the invention to a container, such for instance as an enlarged bottle in actual use, the rubber collar 2 is inserted into the neck of the bottle, and the plug 4 secured therein by slipping the plate 5 over the top of the plug and drawing it down at its opposite ends by means of the bolts 7 which evenly clamp on the opposite ends of the plate to hold the plug tightly in its upper position in the top of the container. The tube 13 extends to a point near the bottom of the container to allow the contents to be drawn off when the needle-valve 15 is unscrewed in the valve 14. On the other hand, the pressure within the container is indicated by the gauge 18 which communicates therewith through the duct 17, and, when the valve 19 is open, communication is also established between the interior of the container and the rubber pressure container 20, which is so constructed as to expand to compensate for an increase in pressure within the container by reason of any natural chemical action of the fruit juice or beverages, or by means of an outside medium which induces such chemical action. As such chemical action takes place, the air in the top of the container will be placed under greater pressure which will force it into the pressure-container 20, causing expansion thereof, which tends to maintain an approximately constant pressure within the container, and allows the chemical action to take place within the bottle without destruction of either it or its contents.

The clamp plates 21 may be released from an end of the pressure container 20 after the valve 19 has been closed in order to release the pressure within the container 20 when it has become excessive, and this without opening the interior of the container to the atmosphere.

The invention is very simple in construction, while yet effective in its purpose, and may be quickly and easily applied to a container, such, for instance, as an enlarged bottle for holding and preserving fruit juice, beverages, etc., and compensating for the natural chemical action thereof without destruction to the bottle or its contents.

I claim:

1. The combination with a container, of a plug connected therewith, and having a plurality of ducts extending therethrough, an expansible pressure container communicating through one of said ducts with the interior of the first-mentioned container, a tube connected with the end of another of said ducts and extending to a point in proximity to the bottom of the container, a valve connected with said last-mentioned duct through the tube in said duct, means for clamping the plug securely in its proper position on the container, said means including a transverse plate connected with the plug, clamping-plates embracing a portion of the container, and pivotally mounted bolts connecting the transverse and clamping plates together.

2. A device of the character described including a main container for fruit juices capable of expansion through chemical action, an expansible container communicating therewith to receive a fluid from the main container upon expansion of the contents thereof, a valve for regulating said communication, and a pressure gauge communicating with the main and expansible containers.

3. A device of the character described including a container, a plug connected with said container and having a duct therein, and an expansible container connected with the plug and duct and having the ends thereof closed by releasable clamps.

4. A device of the character described including a container, a plug connected with said container and having a duct therein, and an expansible container having the sides thereof permanently closed, and having the ends thereof normally closed by releasable and detachable clamps.

5. A control for fruit juice containers including in combination with a container for fruit juices subject to expansion under chemical action, of a plug communicating with the container, an expansible container communicating through the plug with the main container and normally being closed to the atmosphere, and means for releasing the pressure into the atmosphere from the expansible container.

In testimony whereof I affix my signature.

PETER GUSLUSKY.